E. H. SCHMIDT.
PAWL AND RATCHET BRAKE MECHANISM.
APPLICATION FILED FEB. 17, 1916.
1,284,470.
Patented Nov. 12, 1918.
2 SHEETS—SHEET 1.
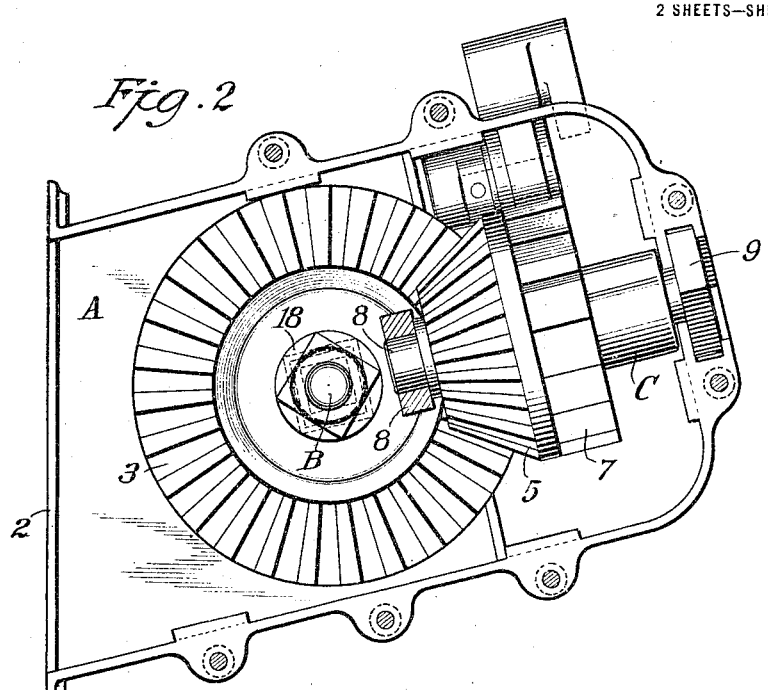
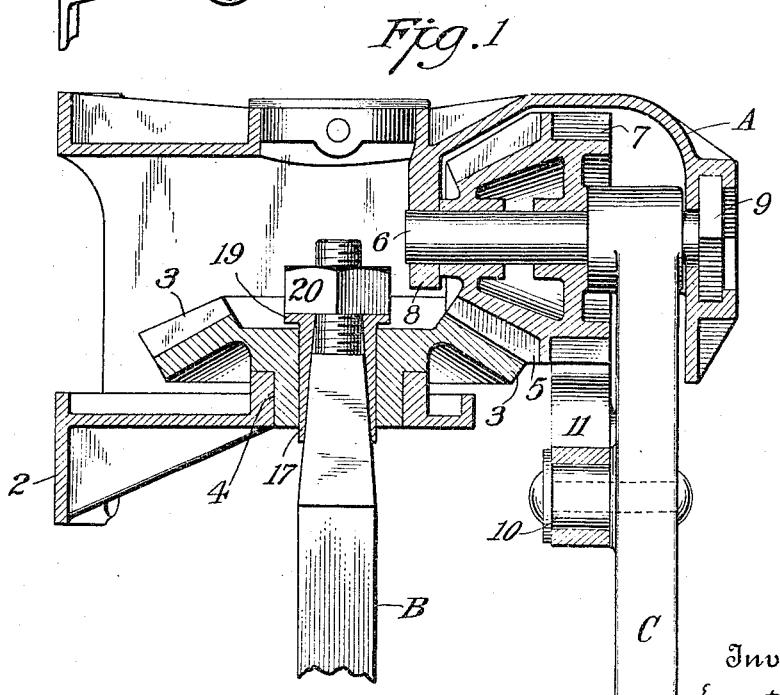
Inventor
Ernest H. Schmidt
By his Attorney
Clarence Ker E. H. SCHMIDT.
PAWL AND RATCHET BRAKE MECHANISM.
APPLICATION FILED FEB. 17, 1916.
1,284,470.
Patented Nov. 12, 1918.
2 SHEETS—SHEET 2.
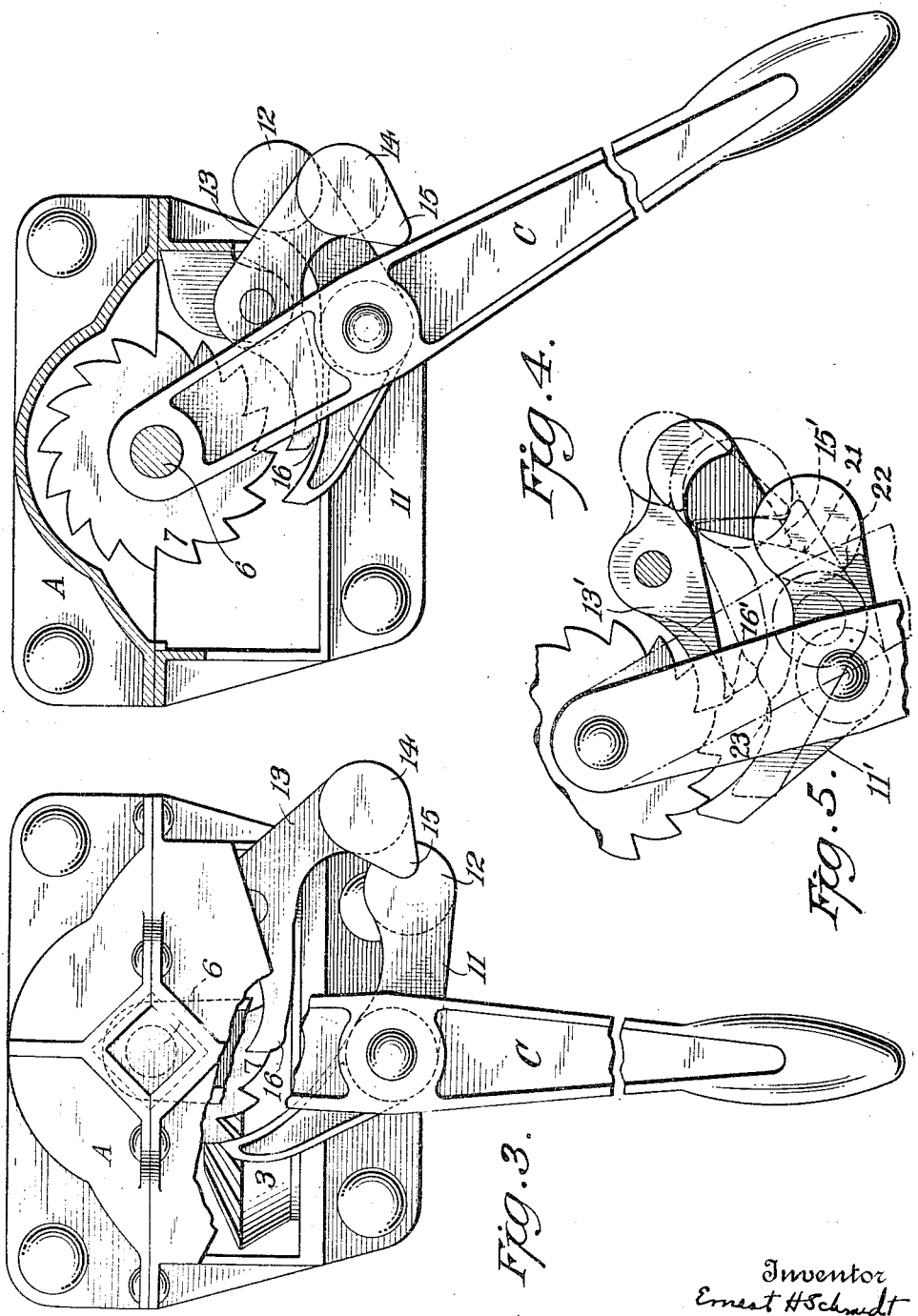
Inventor
Ernest H Schmidt
By his Attorney

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

PAWL-AND-RATCHET BRAKE MECHANISM.

1,284,470.    Specification of Letters Patent.    Patented Nov. 12, 1918.

Application filed February 17, 1916. Serial No. 78,791.

*To all whom it may concern:*

Be it known that I, ERNEST H. SCHMIDT, a citizen of the United States, residing at Cleveland, Cuyahoga county, Ohio, have invented new and useful Improvements in Pawl-and-Ratchet Brake Mechanisms, of which the following is a specification, reference being had to the accompanying drawings, in which—

Figure 1 is a section of a brake mechanism embodying my invention; Fig. 2 is a plan thereof, with the top portion of the casing removed; Fig. 3 is an elevation thereof, partly in section, showing the device in normal position; Fig. 4 is a further elevation, partly in section, showing the ratchet wheel in released position, and Fig. 5 shows a modified form of my device.

My invention relates to brake mechanism of ratchet lever type, in which the brake handle normally depends at the end or side of the car, and consists of novel mechanism for operating and controlling the ratchet wheel. My invention also consists in the construction and coöperation of the parts, which I shall hereinafter describe and claim.

Referring to the drawings, A indicates a container or casing for the brake mechanism, B the brake shaft, and C the operating lever. The container, which is intended to be attached to the end or side of a car, is preferably made in two parts so as to permit it to be readily assembled. The end 2 of the container is in this instance inclined so that when applied to a car the axis of the container will be at an angle to the longitudinal center line of the car (not shown), so as to enable the brakeman to pull the operating lever C directly toward him, and thereby obtain greater leverage than if the lever swung in a plane parallel to the side of the car to which the mechanism is attached. On the upper end of the brake shaft B is secured a bevel gear 3, journaled in a bearing 4 of the casing A and rotatable with the shaft B. Meshing with the gear 3 is a second gear 5, which may be made of smaller diameter than the gear 3, if it is desired to increase the braking power applied to the brake shaft. The gear 5 is loosely journaled upon a pin 6, and preferably has formed integrally with it the ratchet 7. At one end the pin 6 is secured to the lug 8 of the upper half of the casing, and at its other end has a square head 9, which is received between the two halves of the casing A, and is thus held from turning and endwise movement. Also loosely journaled upon the pin 6, adjacent the ratchet 7, is the operating lever C.

Pivoted to the lug 10 on the lever C is an operating pawl 11. As is shown in Figs. 3 and 4, the pawl 11 preferably has a counterweight 12, which tends to press the pawl automatically in engagement with the teeth of the ratchet 7. Pivoted to the casing 2 is a second or holding pawl 13, which preferably has a counterweight 14, likewise intended to hold the end of the pawl 13 in the path of the teeth of the ratchet 7. When the operating lever C is manually operated by swinging to the left (see Fig. 3), the operating pawl 11 engages a tooth of the ratchet and turns it in a clockwise direction, while the holding pawl 13 merely rides over the ratchet teeth but is held by its counterweight 14 in position to engage the teeth of the ratchet when the pull upon the lever ceases. When the lever C is moved to the right, the operating pawl 11 rides over the ratchet teeth into position for a new engagement with the ratchet, while the holding pawl 13 prevents the ratchet from moving in a counterclockwise direction.

When it is desired to release the brakes, the lever C is moved to the right beyond its ordinary operating position, as is shown in Fig. 4, and strikes the projection 15 on the counterweighted end of the holding pawl 13, and rotates its engaging end partly out of engagement with the teeth of the ratchet. As this movement takes place the shoulder 16 on the holding pawl strikes the engaging end of the operating pawl 11, as is shown in Fig. 4, and moves that pawl away from the ratchet. As the lever C continues its movement to the right, it continues to rotate the pawl 13 out of engagement with the ratchet, and the shoulder 16 of the pawl 13 in turn moves the pawl 11 away from the ratchet, until, when the pawl 13 is clear of the ratchet teeth, the ratchet is free to revolve and release the brakes. It will thus be seen that during the releasing operation the holding pawl 13 engages the teeth of the ratchet and only releases the ratchet after its shoulder 16 has disengaged the operating pawl 11 from the ratchet.

In order to provide for variations in the length of brake shafts and for slight variations in the height at which the casing may be applied to the car, I have provided the upper end of the brake shaft B with a collar 17, tapered upon its inner surface to fit the tapered end of the brake shaft. The outside of the collar is square and has a sliding fit within the square opening 18 of the gear 3. The upper end of the collar has an outwardly-extending flange 19 to prevent the collar from drawing or pulling down through the hub of the gear 3. The collar is held in position by means of the nut 20, intended to be applied to the upper end of the brake shaft and which forces the collar tightly down upon the taper of the shaft B. Slight variations in the length of the brake shaft and in the location of the collar will thus result merely in the collar 17 seating slightly higher or lower within the hub of the gear 3.

In Fig. 5 I have shown a modification of my device, in which the release of retaining pawl 13' is effected by means of the engagement of the projection 15' with a shoulder 21 on the counterweighted end of the operating pawl 11' instead of by the engagement of the retaining pawl by the lever. As the lever C is moved to the right to disengage the pawls from the ratchet, the shoulder 21 will strike the projection 15' and ride up its inclined inner surface until the point of the projection 15' strikes the notch 22 in the under surface of the shoulder 21. The sliding movement between the pawls then ceases and further movement of the lever causes the operating pawl 11' to rotate the retaining pawl 13', so as to disengage it from the ratchet teeth. After the pawl 13' has been disengaged from the ratchet further movement of the lever to the right causes the small shoulder 16' on the pawl 13' to engage the projection 23 on the pawl 11' and this, with the contact between the projection 15' and the notch 22, limits the movement of the pawl 11' and with it the releasing movement of the lever.

My improved brake mechanism is applicable to all cars in which a ratchet lever may be used. It can be operated entirely with one hand, thus permitting the brakeman to steady himself upon the car with his free hand while operating the brake. The mechanism also gives a greatly increased braking power over the ordinary type of ratchet lever brake, since the lever is geared to the brake shaft through bevel gears, which may be of such relative diameters as to afford an increase upon the brake shaft of the power applied to the lever.

A further advantage of my improved construction is that it does away with the necessity of using a foot-operated pawl and ratchet for holding the brake shaft while the lever is being operated, as is ordinarily the practice. Another advantage lies in the fact that the ratchet lever cannot swing around and injure the operator, if suddenly released during any part of its operation.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In brake mechanism, a container, a gear mounted therein, a tapered sleeve mounted in the hub of said gear and adapted to take about the tapered end of a brake shaft, means for securing said sleeve to said brake shaft, said sleeve being adapted to provide for variations in position of said brake shaft and gear, and means connected to said gear for operating the same, said means consisting of ratchet and pawl mechanism and a controlling lever.

2. In brake mechanism, a ratchet wheel operatively connected with a brake shaft, a holding pawl, an operating pawl, said ratchet wheel being in engagement with said pawls, and a lever controlling the movements of said pawls, said lever being adapted to actuate the holding pawl on the opposite side of its pivot from its ratchet-engaging end, and to rotate said pawl about its pivot, and said holding pawl being adapted to actuate the operating pawl between its pivot and its ratchet-engaging end, and to rotate said pawl about its pivot.

ERNEST H. SCHMIDT.

Copies of this patent may be obtained for five cents each, by addressing the "Commissioner of Patents, Washington, D. C."